US009378755B2

(12) United States Patent
Thornburg et al.

(10) Patent No.: US 9,378,755 B2
(45) Date of Patent: Jun. 28, 2016

(54) DETECTING A USER'S VOICE ACTIVITY USING DYNAMIC PROBABILISTIC MODELS OF SPEECH FEATURES

(71) Applicant: Apple Inc., Cupertino, CA (US)

(72) Inventors: Harvey D. Thornburg, Cupertino, CA (US); Charles P. Clark, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 14/502,795

(22) Filed: Sep. 30, 2014

(65) Prior Publication Data

US 2015/0348572 A1   Dec. 3, 2015

Related U.S. Application Data

(60) Provisional application No. 62/005,159, filed on May 30, 2014.

(51) Int. Cl.
| | |
|---|---|
| *G10L 15/20* | (2006.01) |
| *G10L 19/04* | (2013.01) |
| *G10L 25/84* | (2013.01) |

(52) U.S. Cl.
CPC .............. *G10L 25/84* (2013.01); *G10L 15/20* (2013.01); *G10L 19/04* (2013.01)

(58) Field of Classification Search
CPC .......... G10L 15/20; G10L 19/04; G10L 25/84
See application file for complete search history.

(56) References Cited

U.S. PATENT DOCUMENTS

| | | | |
|---|---|---|---|
| 7,383,181 B2 | 6/2008 | Huang et al. | |
| 8,412,525 B2 | 4/2013 | Mukerjee et al. | |
| 8,650,028 B2 | 2/2014 | Su et al. | |
| 2004/0101048 A1* | 5/2004 | Paris | G10L 19/04 375/240.12 |
| 2012/0010881 A1* | 1/2012 | Avendano | G10L 21/0208 704/226 |

* cited by examiner

*Primary Examiner* — King Poon
*Assistant Examiner* — Ibrahim Siddo
(74) *Attorney, Agent, or Firm* — Blakely, Sokoloff, Taylor & Zafman LLP

(57) ABSTRACT

Method of detecting voice activity starts with by generating probabilistic models that respectively model features of speech dynamically over time. Probabilistic models may model each feature dependent on a past feature and a current state. Features of speech may include a nonstationary signal presence feature, a periodicity feature, and a sparsity feature. Noise suppressor may then perform noise suppression on an acoustic signal to generate a nonstationary signal presence signal and a noise suppressed acoustic signal. An LPC module may then perform residual analysis on the noise suppressed data signal to generate a periodicity signal and a sparsity signal. Inference generator receives the probabilistic models and receives, in real-time, nonstationary signal presence signal, periodicity signal, and sparsity signal. Inference generator may then generate in real time an estimate of voice activity based on the probabilistic models, nonstationary signal presence signal, periodicity signal, and sparsity signal. Other embodiments are also described.

20 Claims, 6 Drawing Sheets

DETECTING A USER'S VOICE ACTIVITY USING DYNAMIC PROBABILISTIC MODELS OF SPEECH FEATURES

CROSS-REFERENCED APPLICATIONS

This application claims the benefit of the U.S. Provisional Application No. 62/005,159, filed May 30, 2014, the entire contents of which are incorporated herein by reference.

FIELD

Embodiments of the invention relate generally to systems and methods for detecting a user's voice activity using dynamic probabilistic models of speech features. Specifically, using dynamic probabilistic models over a plurality of frames, general behaviors for the nonstationary signal presence feature, the periodicity feature, and the sparsity feature are modeled and based on these models, a real-time detection of voice activity may be generated.

BACKGROUND

Currently, a number of consumer electronic devices are adapted to receive speech via microphone ports or headsets. While the typical example is a portable telecommunications device (mobile telephone), with the advent of Voice over IP (VoIP), desktop computers, laptop computers and tablet computers may also be used to perform voice communications.

When using these electronic devices, a common complaint is that the speech captured by the microphone port or the headset includes environmental noise such as secondary speakers in the background or other background noises. This environmental noise often renders the user's speech unintelligible and thus, degrades the quality of the voice communication.

SUMMARY

Generally, the invention relates to systems and methods for detecting a user's voice activity using dynamic probabilistic models of speech features. Embodiments of the invention explicitly model temporal dynamics at the observation layer. Specifically, dynamic probabilistic models that respectively model features of speech dynamically over time are generated. Using these models, a real-time detection of voice activity may be generated.

In embodiments of the invention, when the electronic device receive acoustic signals that include speech and noise, the Voice Activity Detector (VAD) included in the electronic device may analyze the acoustic signal to determine when the user's voice activity is detected. One issue that the VAD encounters is how to determine when the user is done speaking. Both early truncations of the acoustic signal during the speech portion or waiting too long after the end of the speech portion greatly diminish the quality of the voice communication. Some commonly used approaches include the framewise ("static") features and decisions approach. Observations are thus treated as uncorrelated emissions of the underlying hidden state sequence when using the Hidden Markov Model (HMM) on these static features. The drawbacks of this static approach include that (i) the features are being treated as static when speech is dynamic, (ii) the speech and non-speech distributions are ambiguous and long-tailed, and (iii) a large number of features are needed to implement this static approach in the presence of significant background noise.

In contrast, embodiments of the invention focus on "dynamic" features which model dynamics (e.g., temporal trends and patterns) of observed features. Like a Hidden Markov Model (HMM), dynamic features take advantage of temporal continuity of speech state hypotheses (e.g., model dynamic features as emissions from a comparatively slowly-varying state sequence). Unlike an HMM, dynamic features explicitly model temporal patterns of the feature layer in conjunction with speech state continuity hypotheses of the state layer. Dynamic feature modeling is therefore able to make better use of a small set of features, by modeling how those features evolve through time in relation to corresponding state hypotheses. Dynamic features may be computed using a Dynamic Bayesian Network (DBN), for which the Viterbi decoding principle can be applied in a manner similar to HMM decoding for Automatic Speech Recognition (ASR). The difference is that the Viterbi algorithm must account for conditional temporal dependence at both the state layer and the feature layer of the DBN, as opposed to conditional dependence in just the state layer of an HMM.

In one embodiment of the invention, a method of detecting a user's voice activity starts with a speech features model generator generating probabilistic models that respectively model features of speech dynamically over time. The probabilistic models may model each feature dependent on a past feature and a current state. The features of speech may include a nonstationary signal presence feature, a periodicity feature, and a sparsity feature. A noise suppressor may then perform noise suppression on an acoustic signal to generate a nonstationary signal presence signal and a noise suppressed acoustic signal. A Linear Predictive Coding (LPC) module may then perform residual analysis on the noise suppressed data signal to generate a periodicity signal and a sparsity signal. An inference generator receives the probabilistic models and receives, in real-time, the nonstationary signal presence signal, the periodicity signal, and the sparsity signal. The inference generator may then generate in real time an estimate for detection of voice activity based on the probabilistic models, the nonstationary signal presence signal, the periodicity signal, and the sparsity signal.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
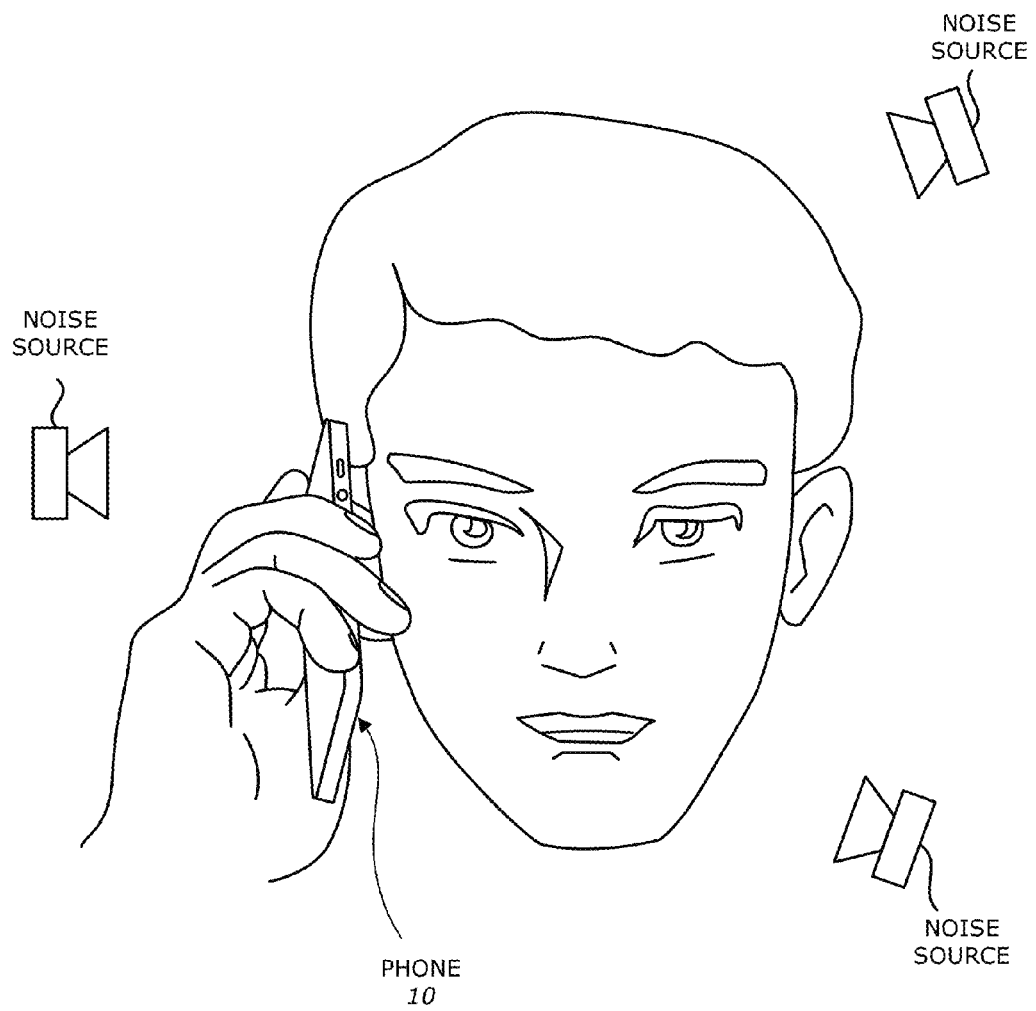
FIG. 1 illustrates an example of the electronic device in use according to one embodiment of the invention.

FIG. 1 illustrates an example of the electronic device in use according to one embodiment of the invention. In FIG. 1, the electronic device 10 is illustrated as a mobile communication device such as a mobile telephone device or a smart phone. However, it is understood that the electronic device 10 may be other personal consumer electronic devices such as computers, laptops, and tablet computers, as described in FIG. 6 below. As shown in FIG. 1, the user may hold the electronic device 10 to his ear (i.e., at-ear position) and the microphones 111 in the electronic device 10 may receive his speech. The microphones 111 may be air interface sound pickup devices that convert sound into an electrical signal. In some embodiments, the user may use a headset that includes a pair of earbuds and a headset wire. The user may place one or both the earbuds into his ears and the microphones 111 in the headset may receive his speech. In still other embodiments, for instance speakerphone use case, the device may be at a significant distance from the user: at arm's length, on a table, and so forth. As the user is using the microphones 111 included in the electronic device 10 or in the headset to transmit his speech, environmental noise may also be present (e.g., noise sources in FIG. 1). Additionally, embodiments of the invention may also use other types of headsets.

Figure 2:
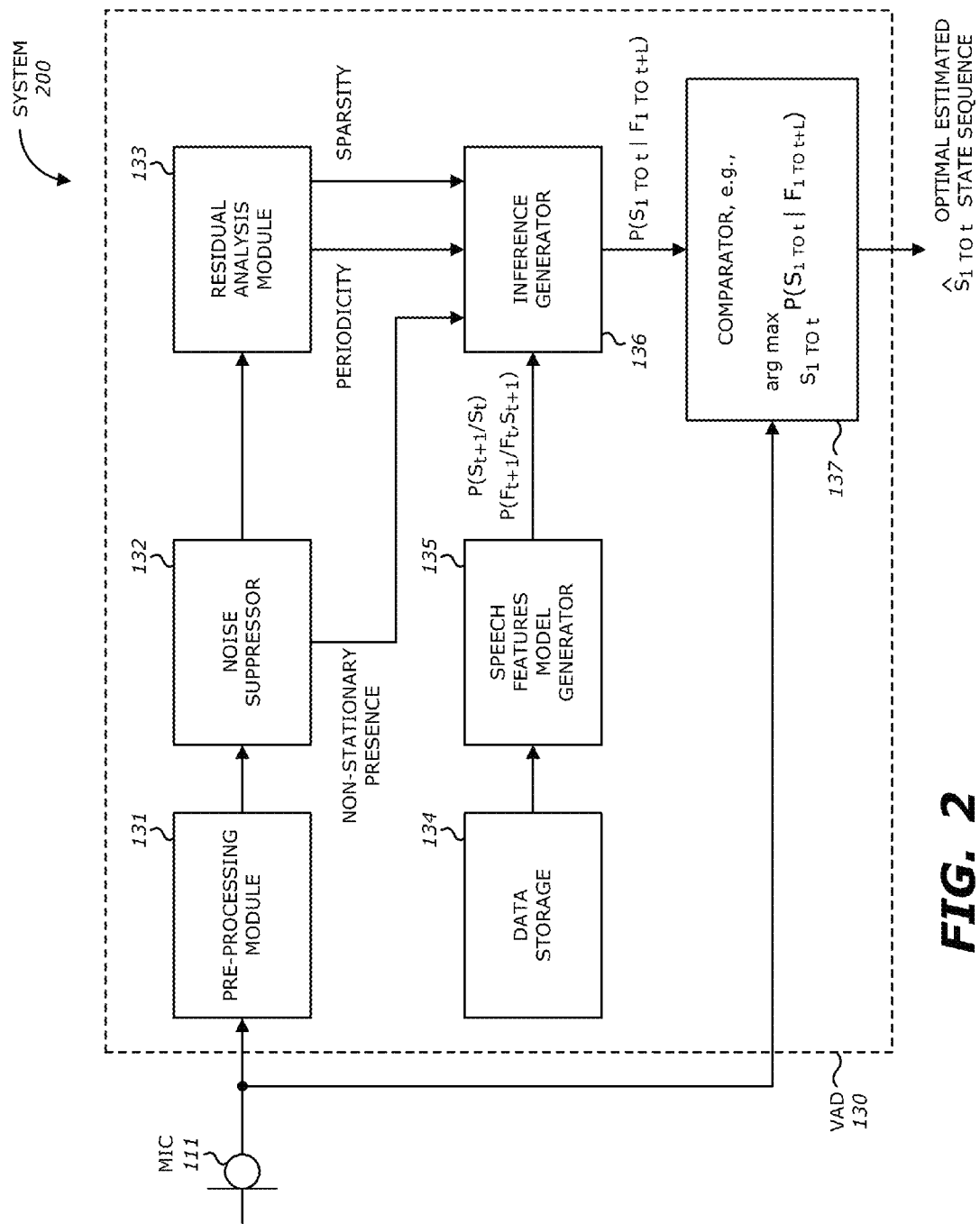
FIG. 2 illustrates a block diagram of a system detecting a user's voice activity according to one embodiment of the invention.

FIG. 2 illustrates a block diagram of a system 200 detecting a user's voice activity according to one embodiment of the invention. The system 200 in FIG. 2 includes at least one of the microphones 111 included in the electronic device 10 that further includes a Voice Activity Detector (VAD) 130. As shown in FIG. 2, the VAD 130 receives the acoustic signals received from the microphone 111. While FIG. 2 illustrates a single microphone of the microphones 111 providing acoustic signals to the VAD 130, it is understood that a plurality of microphones 111 and/or microphone array may also be used.

As shown in FIG. 2, the VAD 130 receives the acoustic signals from the microphone 111 and determines whether a user's voice activity (or speech) is detected in the acoustic signal. When the user speaks, his speech signals may include voiced speech and unvoiced speech. Voiced speech is speech that is generated with excitation or vibration of the user's vocal chords. In contrast, unvoiced speech is speech that is generated without excitation of the user's vocal chords. For example, unvoiced speech sounds include /s/,/sh/,/f/, etc. Accordingly, in some embodiments, both the types of speech (voiced and unvoiced) are detected in order to generate a voice activity detector (VAD) output, which more faithfully represents the user's speech.

In one embodiment of the invention, the VAD 130 receives the acoustic signals from the microphone 111 and generates a VAD output that takes into account both voiced speech and unvoiced speech and also considers the possibility of noises in the environment being falsely identified as being voiced speech in the acoustic signals. The VAD output may then be used in a number of ways including noise suppression, and beamforming. As shown in FIG. 2, the VAD 130 includes a pre-processing module 131, a noise suppressor 132, a residual analysis module 133, a data storage 134, a speech features model generator 135, a real-time inference generator 136, and a comparator 137.

Figure 3:
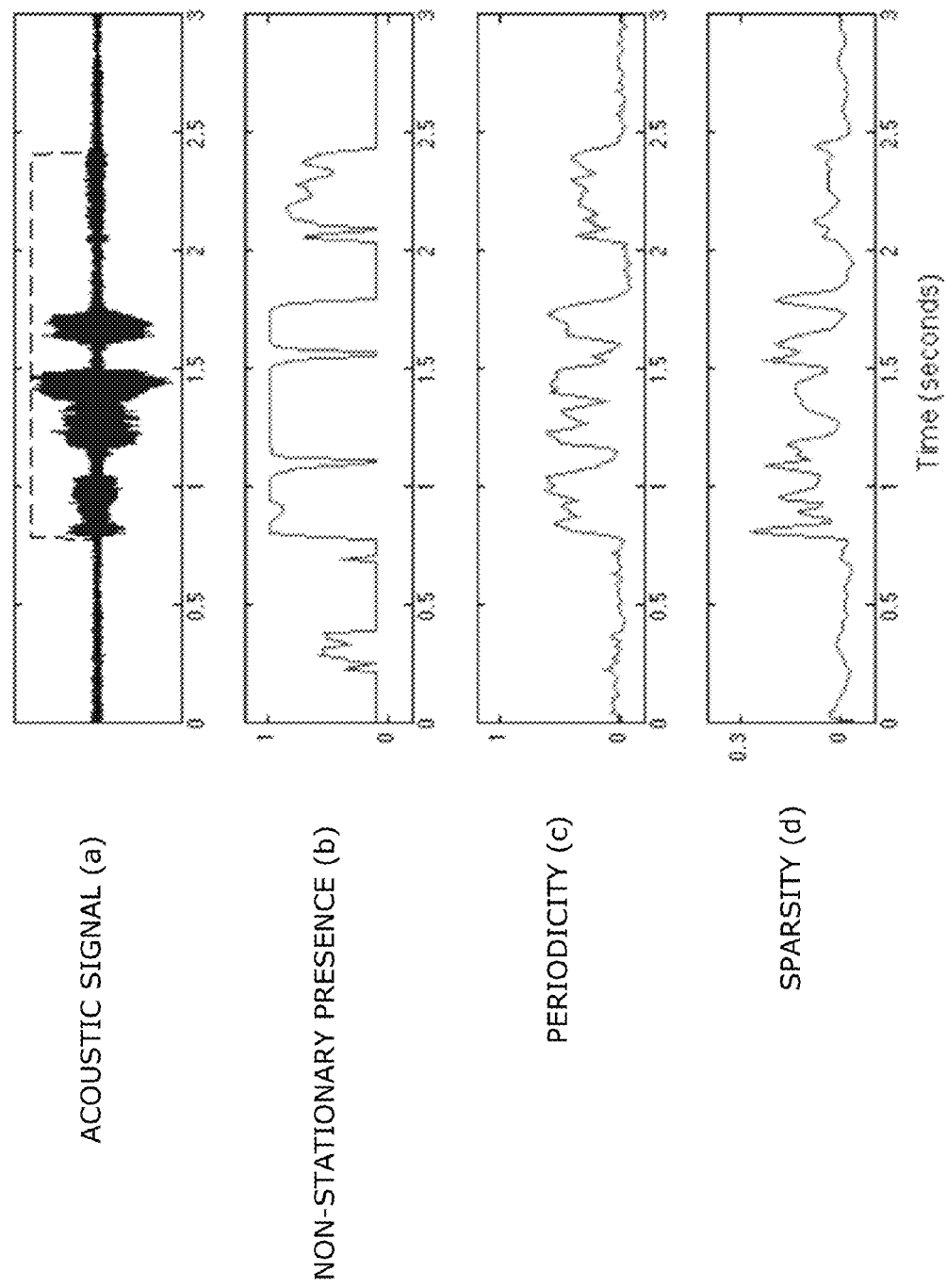
FIG. 3 illustrates graphs of (a) a sample audio signal, and the speech features including (b) nonstationary signal presence signal, (c) periodicity signal, and (d) sparsity signal according to one embodiment of the invention.

The acoustic signals from the microphone 111 may include speech and noise. Thus, when the VAD 130 receives the acoustic signals, the pre-processing module 131 may perform signal pre-processing on the acoustic signal. The signal pre-processing includes for example high pass filtering, Sample Rate Conversion (SRC), etc. The noise suppressor 132 then receives the pre-processed acoustic signals and suppresses the stationary noises that are included in the acoustic signals. Stationary noises may include hisses, humming, deeply reverberated sounds, etc. However, the noise suppressor 132 may not suppress the non-stationary noises (e.g., transient sounds such as shutting doors, crackling paper, etc). The noise suppressor 132 also generates a nonstationary signal presence signal that gives an indication of non-stationary signal (or sub-band) energy above background level, which may be voice, but may also be, for instance, nonstationary noise. FIG. 3 illustrates graphs of (a) a sample audio signal, and the associated (b) nonstationary signal presence signal according to one embodiment of the invention. The noise suppressor 132 also outputs a first stage noise-suppressed acoustic signal to the residual analysis module 133, which may perform Linear Predictive Coding (LPC) residual analysis on the signal. The residual analysis module 133 generates a periodicity signal and a sparsity signal. Referring to FIG. 3, graphs of (a) a sample audio signal, and the associated speech features including (c) periodicity signal, and (d) sparsity signal are illustrated according to one embodiment of the invention. The periodicity signal is an autocorrelation measure on the LPC residual (e.g., whitened signal) while the sparsity signal is a ratio of L1 and L2 norms on the same LPC residual. The periodicity signal provides a good indication of the presence of voiced speech in an acoustic signal but is not an indication of all forms of speech (e.g., unvoiced, some consonants, etc.). The sparsity signal provides an indication of how closely the acoustic signal resembles (i.e., a measure of goodness of fit) a speech waveform, which is an impulsive excitation of the glottal pulse during voiced segments and noise.

Referring to FIG. 3, each of the speech features including the (b) nonstationary signal presence signal, (c) periodicity signal, and (d) sparsity signal individually provides an indication of elements associated with speech but none of these features can determine speech reliably. However, embodiments of the invention use the combination of the features to more accurately determine the speech portions of the acoustic signal. In embodiments of the invention, the static value of each feature is not used but rather the whole temporal trajectory of each of the features is observed and used to determine the portions of speech in the acoustic signals. In other words, the whole dynamics of how each feature evolves over time is being used. For instance, the temporal trajectory of the nonstationary signal presence signal that indicates speech will consistently be high (e.g., active) when the user is talking and punctuated with short gaps when the user is pausing. During non-speech, the temporal trajectory of the nonstationary signal presence signal may still activate (e.g., high) but only for shorter regions (e.g., random fluctuations). The temporal trajectory of the periodicity signal will include rapid oscillations during speech and small blips during non-speech. Accordingly, rather than the amplitude or value of the periodicity signal, it is the pattern of the oscillations of the periodicity signal that is used to determine speech.

Figure 4:
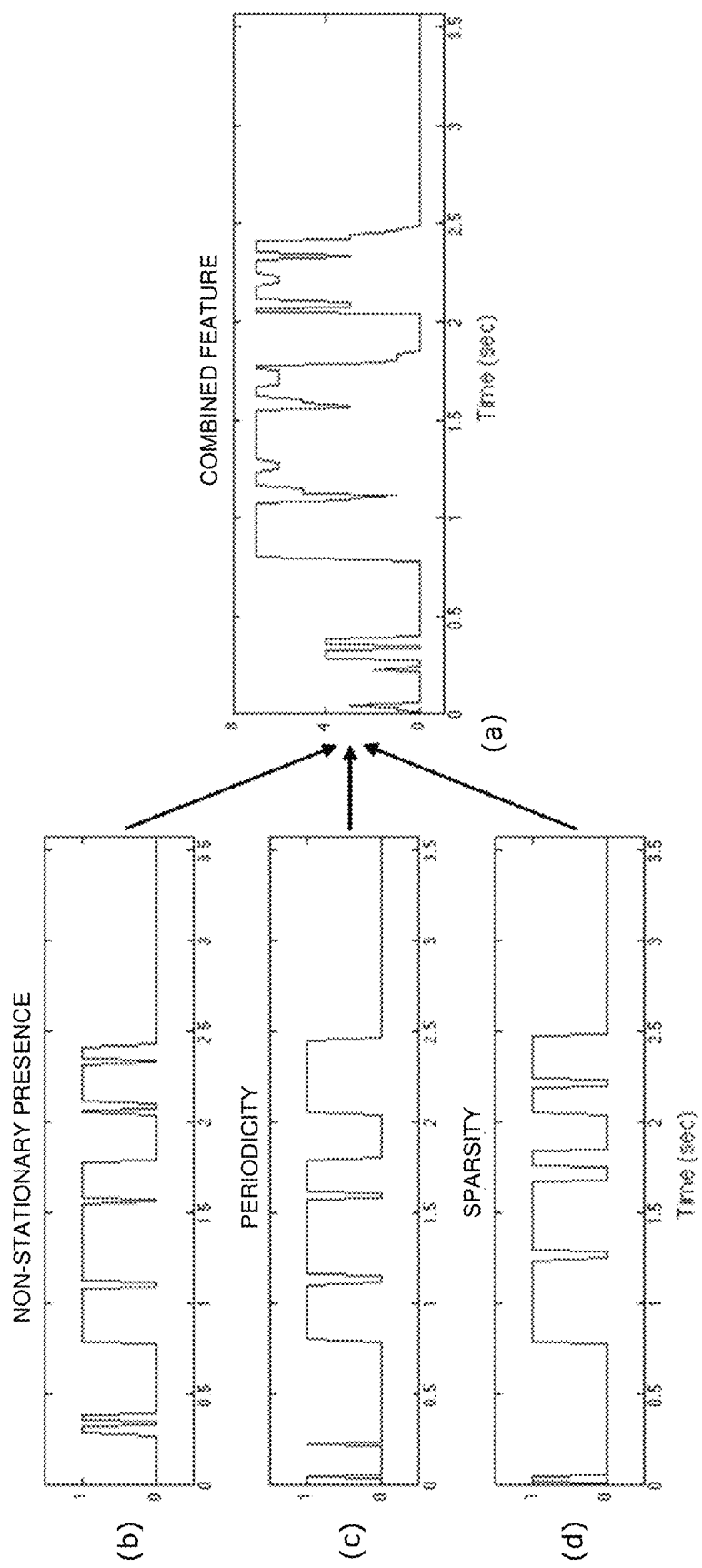
FIG. 4 illustrates graphs of (a) the observation model for detection of voice activity using the speech features including (b) nonstationary signal presence signal, (c) periodicity signal, and (d) sparsity signal according to one embodiment of the invention.

In order for embodiments of the invention to use the temporal trajectory of the features, the system 200 in FIG. 2 may learn signal transitions and prior probabilities from data. Data may include test acoustic signals including a number of known utterances (e.g., 500 utterances or 10 minutes of speech and non-speech), speech sequences, non-speech sequences, etc. Referring back to FIG. 2, data storage 134 may store the data from which the system 200 learns these signal transitions and prior probabilities, and the speech features model generator 135 may generate observation models and state models there from. In some embodiments, a discrete dynamical model is generated including Markov dependence at both observation layer and state layer. FIG. 4 illustrates graphs of (a) the observation model for detection of voice activity using the speech features including (b) nonstationary signal presence signal, (c) periodicity signal, and (d) sparsity signal according to one embodiment of the invention. In generating the observation model, the speech features model generator 135 may count transitions in the example speech sequences and in the example non-speech sequences. The speech features model generator 135 may generate models having a complexity that adapts to the amount of data available. In some embodiments, the speech features model generator 135 may use chained Dirichlet regularizations over nested model structures of increasing complexity in order to adapt the model complexity to the amount of available training data. In some embodiments, the speech features model generator 135 generates state models based on the data. The state models may be regularized estimates from empirical mean segment durations. In other words, a multi-feature dynamical model may be generated using a segmentation hypothesis with "hidden state" switching. Accordingly, embodiments of the present invention include a combined Markov model at the feature layer that models the evolution of the observed features over time and a Markov model for the unknown speech state. As shown in FIG. 2, the output of the speech features model generator 135 may be probability distributions (or models): (i) $P(S_{t+1}|S_t)$ that models the current state ($S_{t+1}$) dependent on the past state ($S_t$) and (ii) $P(F_{t+1}|F_t, S_{t+1})$ that models the feature ($F_{t+1}$) dependent on the past feature ($F_t$) and the current state ($S_{t+1}$), wherein t represents a time frame.

Referring back to FIG. 2, the inference generator 136 receives the probability distributions from the speech features model generator 135 and receives in real-time the features including the nonstationary signal presence signal from the noise suppressor 132, and the periodicity and the sparsity signals from the residual analysis module 133. The inference generator 136 may use a modified Viterbi algorithm that computes the posterior probability distribution of hidden state sequences conditioned on the entire history of received real-time features. In other words, the inference generator 136 generates an estimated probability $P(S_{1\ to\ t}|F_{1\ to\ t})$ of the entire past history in real-time (e.g., 1 to t) of the state sequence $S_{1\ to\ t}$. From this estimate, it can be determined where speech turned on and speech turned off. In some embodiments, the inference generator 136 operates with a look-ahead latency (t+L) that allows the VAD 130 to make a decision at time t using information up to t+L. The latency may be for instance 0.4 seconds. In this embodiment, the inference generator 136 generates an estimate of $P(S_{1\ to\ t}|F_{1\ to\ t+L})$ of the entire past history in delayed real-time of the state sequence (e.g., 1 to t) given the full observed evidence from 1 to (t+L).

In some embodiments, as shown in FIG. 2, the posterior probability estimate (e.g., $P(S_{1\ to\ t}|F_{1\ to\ t+L})$) outputted by the inference generator 136 is received by the comparator 137. The comparator 137 may use a criterion for selecting the optimal sequence $S_{1\ to\ t}$ given the posterior probability estimate $P(S_{1\ to\ t}|F_{1\ to\ t+L})$. For example, the comparator 137 may use the criterion of maximum a posteriori by selecting the sequence $S_{1\ to\ t}$ for which the posterior distribution $P(S_{1\ to\ t}|F_{1\ to\ t+L})$ is maximum. Using such a criterion, the comparator 137 may output the VAD estimate $S_1$ accordingly for time t. For instance, VAD output may be set to 0 when speech is not detected and set to 1 when speech is detected. The VAD output may be used to perform beamforming, noise suppression, etc.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
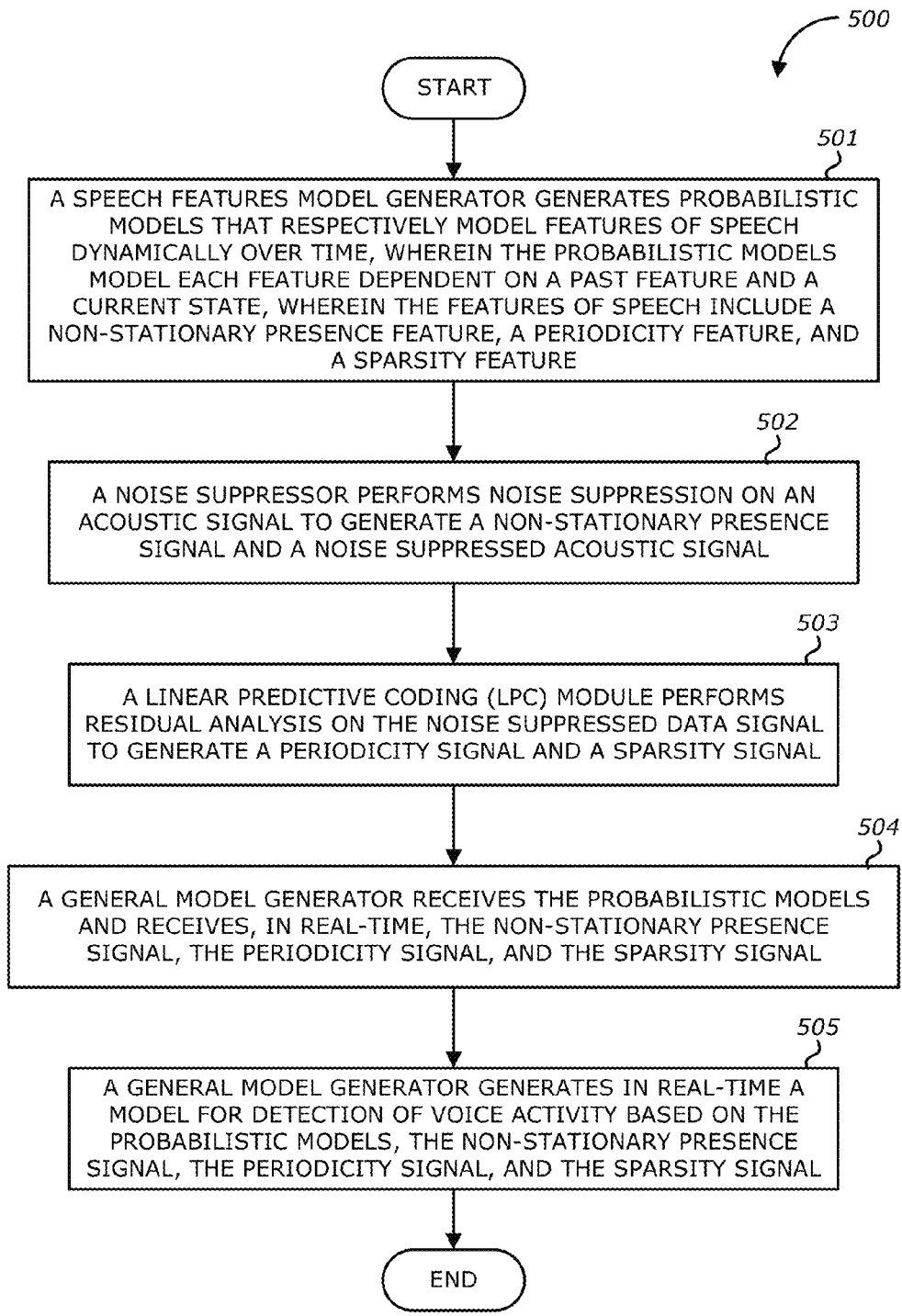
FIG. 5 illustrates a flow diagram of an example method of detecting a user's voice activity according to the first embodiment of the invention.

FIG. 5 illustrates a flow diagram of an example method of detecting a user's voice activity according to the first embodiment of the invention. The method 500 starts at Block 501 with a speech features model generator generating probabilistic models that respectively model features of speech dynamically over time. The probabilistic models may model each feature dependent on a past feature and a current state. The features of speech may include a nonstationary signal presence feature, a periodicity feature, and a sparsity feature. In one embodiment, the probabilistic models are generated by applying a Dynamic Bayesian Network model at feature layers that models evolution of each feature over time.

At Block 502, a noise suppressor may perform noise suppression on an acoustic signal to generate a nonstationary signal presence signal and a noise suppressed acoustic signal. At Block 503, a Linear Predictive Coding (LPC) module may then perform residual analysis on the noise suppressed data signal to generate a periodicity signal and a sparsity signal. At Block 504, an inference generator receives the probabilistic models and receives, in real-time, the nonstationary signal presence signal, the periodicity signal, and the sparsity signal. At Block 505, the inference generator then generates in real time an estimate of the posterior probability distribution for voice activity based on the probabilistic models, the nonstationary signal presence signal, the periodicity signal, and the sparsity signal. In one embodiment, the inference generator generates the posterior distribution of voice activity by applying a Viterbi algorithm that has been modified to function in real time. The posterior distribution of voice activity may be an estimate of an entire past history in real-time of a speech state given a latency. In some embodiments, a comparator receives the posterior distribution of voice activity, applies a criterion for selecting the optimal sequence given the posterior distribution, and generates a VAD output that indicates whether the acoustic signal includes speech.

Figure 6:
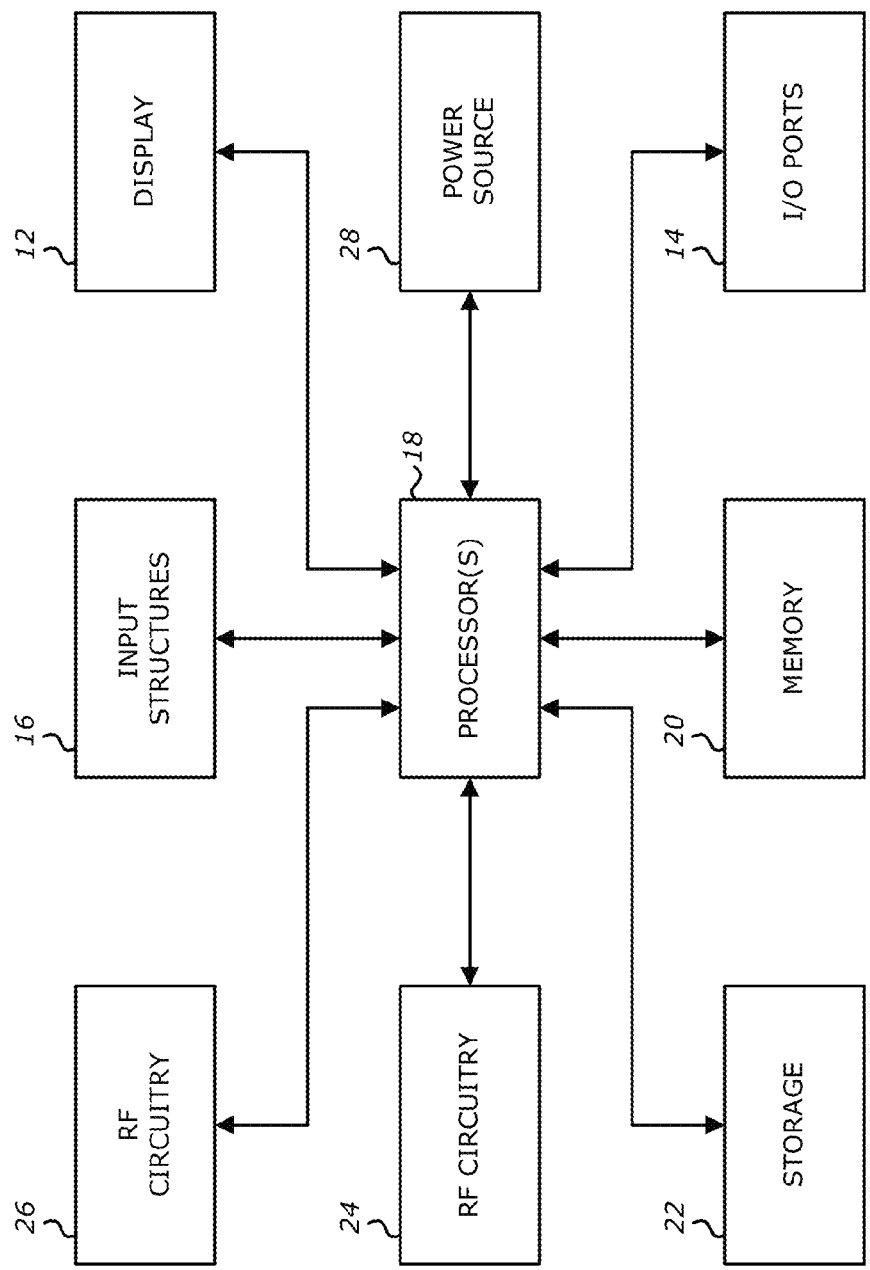
FIG. 6 is a block diagram of exemplary components of an electronic device detecting a user's voice activity in accordance with aspects of the present disclosure.

A general description of suitable electronic devices for performing these functions is provided below with respect to FIG. 6. Specifically, FIG. 6 is a block diagram depicting various components that may be present in electronic devices suitable for use with the present techniques. For instance, examples of a suitable electronic device include a computer, a handheld portable electronic device, and a computing device having a tablet-style form factor. These types of electronic devices, as well as other electronic devices providing comparable voice communications capabilities (e.g., VoIP, telephone communications, etc.), may be used in conjunction with the present techniques.

Keeping the above points in mind, FIG. 6 is a block diagram illustrating components that may be present in one such electronic device 10, and which may allow the device 10 to function in accordance with the techniques discussed herein. The various functional blocks shown in FIG. 6 may include hardware elements (including circuitry), software elements (including computer code stored on a computer-readable medium, such as a hard drive or system memory), or a combination of both hardware and software elements. It should be noted that FIG. 6 is merely one example of a particular implementation and is merely intended to illustrate the types of components that may be present in the electronic device 10. For example, in the illustrated embodiment, these components may include a display 12, input/output (I/O) ports 14, input structures 16, one or more processors 18, memory device(s) 20, non-volatile storage 22, expansion card(s) 24, RF circuitry 26, and power source 28. In some embodiments, the processor 18 executes instructions that are stored in the memory devices 20 that cause the processor 18 to perform the method to detect user voice activity as described in FIG. 5.

In one embodiment, the electronic device 10 is in the form of a computer that may include computers that are generally portable (such as laptop, notebook, tablet, and handheld computers), as well as computers that are generally used in one place (such as conventional desktop computers, workstations, and servers). The computer includes a housing or enclosure, the display 12 (e.g., as an LCD or some other suitable display), I/O ports 14, and input structures 16.

The electronic device 10 may also take the form of other types of devices, such as mobile telephones, media players, personal data organizers, handheld game platforms, cameras, and/or combinations of such devices. For instance, the device 10 may be provided in the form of a handheld electronic device that includes various functionalities (such as the ability to take pictures, make telephone calls, access the Internet, communicate via email, record audio and/or video, listen to music, play games, connect to wireless networks, and so forth).

In another embodiment, the electronic device 10 may also be provided in the form of a portable multi-function tablet computing device. In certain embodiments, the tablet computing device may provide the functionality of media player, a web browser, a cellular phone, a gaming platform, a personal data organizer, and so forth.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of detecting a user's voice activity comprising:
generating by a speech features model generator probabilistic models that respectively model features of speech dynamically over time, wherein the probabilistic models model each feature dependent on a past feature and a current state, wherein the features of speech include a nonstationary signal presence feature, a periodicity feature, and a sparsity feature;
performing noise suppression by a noise suppressor on an acoustic signal to generate a nonstationary signal presence signal and a noise suppressed acoustic signal;
performing by a Linear Predictive Coding (LPC) module residual analysis on the noise suppressed acoustic signal to generate a periodicity signal and a sparsity signal;
receiving by an inference generator the probabilistic models and in real-time, the nonstationary signal presence signal, the periodicity signal, and the sparsity signal; and
generating by the inference generator in real time an estimate of voice activity based on the probabilistic models, the nonstationary signal presence signal, the periodicity signal, and the sparsity signal.

2. The method in claim 1, wherein generating probabilistic models includes applying a Dynamic Bayesian Network model at feature layers that models evolution of features jointly over time.

3. The method in claim 1, wherein generating in real time the estimate of voice activity comprises generating in real time a posterior distribution of voice activity by applying a Viterbi algorithm that has been modified to function in real time.

4. The method in claim 3, wherein the posterior distribution voice activity is estimated from an entire past history in real-time of a speech state given a latency.

5. The method of claim 4, further comprising:
receiving by a comparator the posterior distribution of voice activity;
applying a criterion for selecting an optimal sequence based on the posterior distribution of voice activity; and
generating a Voice Activity Detection (VAD) output that indicates whether the acoustic signal includes speech.

6. A non-transitory computer-readable storage medium having stored thereon instructions, which when executed by a processor, causes the processor to perform a method of detecting a user's voice activity, the method comprising:
generating probabilistic models that respectively model features of speech dynamically over time, wherein the probabilistic models model each feature dependent on a past feature and a current state, wherein the features of speech include a nonstationary signal presence feature, a periodicity feature, and a sparsity feature;
performing noise suppression on an acoustic signal to generate a nonstationary signal presence signal and a noise suppressed acoustic signal;

performing residual analysis on the noise suppressed data signal to generate a periodicity signal and a sparsity signal;

receiving the probabilistic models and in real-time, the nonstationary signal presence signal, the periodicity signal, and the sparsity signal; and generating in real time an estimate of voice activity based on the probabilistic models, the nonstationary signal presence signal, the periodicity signal, and the sparsity signal.

7. The non-transitory computer-readable storage medium in claim 6, wherein generating probabilistic models includes applying a Dynamic Bayesian Network model at feature layers that models evolution of features jointly over time.

8. The non-transitory computer-readable storage medium in claim 6, wherein generating in real time the estimate of voice activity comprises generating in real time a posterior distribution of voice activity by applying a Viterbi algorithm that has been modified to function in real time.

9. The non-transitory computer-readable storage medium in claim 8, wherein the posterior distribution voice activity is estimated from an entire past history in real-time of a speech state given a latency.

10. The non-transitory computer-readable storage medium of claim 9, further comprising:

receiving the posterior distribution of voice activity;

applying a criterion for selecting an optimal sequence based on the posterior distribution of voice activity; and generating a Voice Activity Detection (VAD) output that indicates whether the acoustic signal includes speech.

11. An electronic device comprising:

at least one microphone; and a Voice Activity Detector (VAD) to receive an acoustic signal from the at least one microphone and to determine whether a user's voice activity is detected in the acoustic signal, wherein the VAD includes:

a speech features model generator to generate probabilistic models that respectively model features of speech dynamically over time, wherein the probabilistic models model each feature dependent on a past feature and a current state, wherein the features of speech include a nonstationary signal presence feature, a periodicity feature, and a sparsity feature, a noise suppressor to perform noise suppression on the acoustic signal to generate a nonstationary signal presence signal and a noise suppressed acoustic signal;

a Linear Predictive Coding (LPC) module to perform residual analysis on the noise suppressed data signal to generate a periodicity signal and a sparsity signal; and an inference generator to receive the probabilistic models, to receive, in real-time, the nonstationary signal presence signal, the periodicity signal, and the sparsity signal, and to generate in real time an estimate of voice activity based on the probabilistic models, the nonstationary signal presence signal, the periodicity signal, and the sparsity signal.

12. The electronic device of claim 11, wherein the VAD further comprises:

a pre-processing module to perform signal pre-processing on the acoustic signal.

13. The electronic device of claim 11, wherein the VAD further comprises:

a data storage to store the data, wherein VAD determines signal transitions and prior probabilities based on the data stored in the data storage, and the speech features model generator generates observation models and state models based on the data stored in the data storage.

14. The electronic device in claim 11, wherein the speech features model generator generates probabilistic models by applying a Dynamic Bayesian Network model at feature layers that models evolution of features jointly over time.

15. The electronic device in claim 11, wherein the inference generator generates in real time the estimate of voice activity comprises the inference generator generating in real time a posterior distribution of voice activity by applying a Viterbi algorithm that has been modified to function in real time.

16. The electronic device in claim 15, wherein the posterior distribution voice activity is estimated from an entire past history in real-time of a speech state given a latency.

17. The electronic device of claim 16, further comprising:

a comparator to receive the posterior distribution of voice activity, to apply a criterion for selecting an optimal sequence based on the posterior distribution of voice activity, and to generate a Voice Activity Detection (VAD) output that indicates whether the acoustic signal includes speech.

18. The electronic device of claim 17, further comprising:

a beamformer to form beamformers based on the VAD output, and a noise suppressor to suppress noise in the acoustic signal based on the VAD output.

19. The electronic device of claim 17, wherein the inference generator operates with a look-ahead latency (t+L) that allows the VAD to make a decision at time t using information up to look ahead (t+L).

20. The electronic device of claim 17, wherein to generate probabilistic models, the speech features model generator uses chained Dirichlet regularizations to adapt a model complexity to an amount of available training data.

* * * * *